US012658637B2

(12) United States Patent
Rouillard et al.

(10) Patent No.: US 12,658,637 B2
(45) Date of Patent: Jun. 16, 2026

(54) CONNECTOR ASSEMBLY COMPRISING A CONNECTOR AND A CONNECTOR POSITION ASSURANCE DEVICE

(71) Applicant: Tyco Electronics France SAS, Pontoise (FR)

(72) Inventors: Xavier Rouillard, Pontoise (FR); Naoufal Yadine, Pontoise (FR)

(73) Assignee: TE Connectivity Solutions GmbH, Schaffhausen (CH)

(*) Notice: Subject to any disclaimer, the term of this patent is extended or adjusted under 35 U.S.C. 154(b) by 477 days.

(21) Appl. No.: 18/158,922

(22) Filed: Jan. 24, 2023

(65) Prior Publication Data

US 2023/0238740 A1 Jul. 27, 2023

(30) Foreign Application Priority Data

Jan. 24, 2022 (FR) ...................................... 2200577

(51) Int. Cl.
*H01R 13/627* (2006.01)
*H01R 13/631* (2006.01)

(52) U.S. Cl.
CPC ....... *H01R 13/6272* (2013.01); *H01R 13/631* (2013.01)

(58) Field of Classification Search
CPC ......................... H01R 13/6272; H01R 13/631; H01R 13/639; H01R 13/641; H01R 13/6271; H01R 13/6273
USPC ........................................ 439/357, 352, 489
See application file for complete search history.

(56) References Cited

U.S. PATENT DOCUMENTS

| | | | | |
|---|---|---|---|---|
| 5,628,649 | A | 5/1997 | Yagi et al. | |
| 10,811,819 | B2 | 10/2020 | Azad et al. | |
| 2010/0233897 | A1 | 9/2010 | Seo et al. | |
| 2012/0282791 | A1 | 11/2012 | Brown et al. | |
| 2019/0296483 | A1 | 9/2019 | Evans | |
| 2020/0153145 | A1 | 5/2020 | Mamiya et al. | |
| 2020/0287326 | A1 | 9/2020 | Masuda et al. | |
| 2021/0044062 | A1 * | 2/2021 | Nawa .................. | H01R 13/639 |

(Continued)

FOREIGN PATENT DOCUMENTS

| | | | |
|---|---|---|---|
| EP | 3410540 | A1 | 12/2018 |
| JP | H07335322 | A | 12/1995 |

(Continued)

OTHER PUBLICATIONS

Japanese Office Action dated Feb. 13, 2024 with English translation, corresponding to Application No. 2023-006267, 11 pages.

*Primary Examiner* — Tulsidas C Patel
*Assistant Examiner* — Jeffrey Mountain
(74) *Attorney, Agent, or Firm* — Barley Snyder

(57) ABSTRACT

A connector assembly includes a connector, and a connector position assurance (CPA) device movably arranged with the connector between a first position and a second position. The CPA device assures mating in a mating direction between the connector and a second connector in the second position. The CPA device includes a body and a latching arm extending therefrom in the mating direction. The latching arm defines at least one chamfered surface portion facing at least partially in a force direction perpendicular to the mating direction and abutting against a stopping surface of the connector in the first position.

20 Claims, 5 Drawing Sheets

(56) References Cited

U.S. PATENT DOCUMENTS

| | | | | |
|---|---|---|---|---|
| 2021/0143578 | A1 | 5/2021 | Azad et al. | |
| 2021/0226382 | A1* | 7/2021 | Yuk | H01R 13/641 |

FOREIGN PATENT DOCUMENTS

| | | | |
|---|---|---|---|
| JP | 2020080270 | A | 5/2020 |
| JP | 2020144987 | A | 9/2020 |
| JP | 2021516848 | A | 7/2021 |

* cited by examiner

CONNECTOR ASSEMBLY COMPRISING A CONNECTOR AND A CONNECTOR POSITION ASSURANCE DEVICE

CROSS-REFERENCE TO RELATED APPLICATIONS

This application claims the benefit of French Patent Application No. 2200577 filed on Jan. 24, 2022, the whole disclosure of which is incorporated herein by reference.

FIELD OF THE INVENTION

The present invention relates to a connector assembly comprising a connector and a connector position assurance device.

BACKGROUND

Connector position assurance (CPA) devices are known in the art which serve to assure a locking between two homologous connectors of a connector system, in particular electrical connectors, in many types of installations, machines, or apparatuses. When installed in a connector system in a final position, also called mated position or locked position, the CPA devices can fulfill the functions of providing additional locking means for the mating between two connectors of the connector system, and of indicating to a user that the connectors are correctly mated. A connector system comprising a CPA device therefore can provide a mating between two connectors that is more durable and reliable than conventional homologous connectors without CPA devices.

Typically, prior to the mating of the two connectors, a CPA device is pre-installed in one connector in a delivery position, also called initial position, first position, pre-installed position or pre-set position. There, it is movably arranged between the delivery position, and the final position. In the final position, the CPA device is configured to assure a mating between one connector and a second connector.

A conventional CPA device typically includes a main body, and a latching arm extending from the main body at least partially in a mating direction of the connector with the second connector. Typically, a stop element blocks the latching arm of the CPA device such that the CPA device is blocked from moving to the final position. A force applied by a second connector to the latching arm can allow the latching arm to circumvent the stop element, allowing a user to move the CPA device to the final position.

However, there is a possibility that in the delivery position, the blocking engagement between the latching arm and the stop element is compromised due to an accidental movement leading to an unwanted displacement of the latching arm. In particular, due to an inadvertent pressure exercised on the CPA device in the mating direction or on the latching arm in a direction perpendicular to the mating direction, the blocking engagement may be released, and the CPA device may be moved to the final position even if the mating of the two connectors incomplete, incorrect or absent.

Such an inadvertent push may result in the CPA device circumventing the stop element leading to a false positive mating of the connectors. This can occur, for example, in the case of shocks during transport and packaging, or from inadvertent strong pushing during handling and installation of the CPA device with respect to the connector, thereby forcing the latching arm beyond the stop element even if the mating second connector is not correctly positioned. This can have negative consequences, such as an unstable electrical connection, or an unwanted decoupling of the connectors, causing electrical malfunctions and even electrical accidents in connected devices or circuits.

SUMMARY

According to an embodiment of the present disclosure, a connector assembly includes a connector, and a connector position assurance (CPA) device movably arranged with the connector between a first position and a second position. The CPA device assures mating in a mating direction between the connector and a second connector in the second position. The CPA device includes a body and a latching arm extending therefrom in the mating direction. The latching arm defines at least one chamfered surface portion facing at least partially in a force direction perpendicular to the mating direction and abutting against a stopping surface of the connector in the first position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
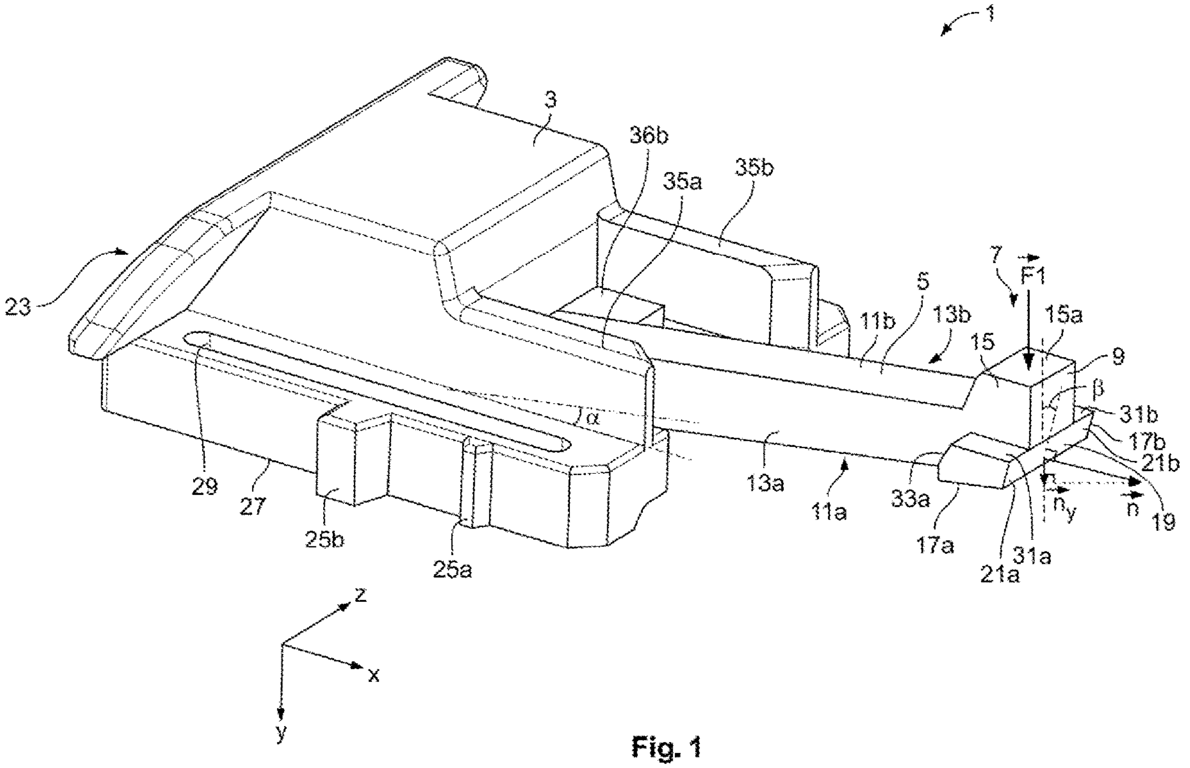
FIG. 1 illustrates a CPA device according to a first embodiment of the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In view of the above, it is an object of the present disclosure to provide an improved connector assembly, and in particular a connector assembly with improved protection against the accidental push of a CPA device to a mated position. In particular, the object is to provide a connector assembly providing an additional resistance against wrongful or accidental manipulation of the connector assembly, as well as additional resistance against pushes or shocks upon the CPA device.

Figure 2:
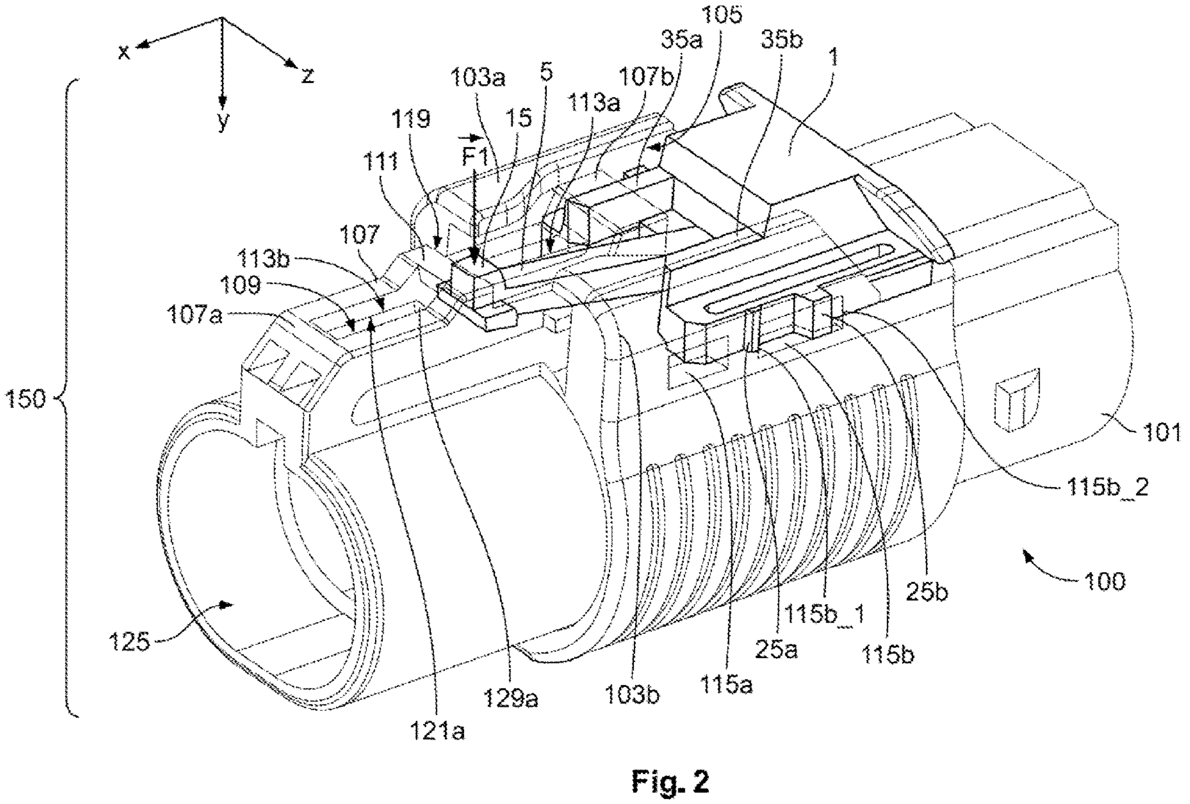
FIG. 2 illustrates a connector assembly of a CPA device inserted in a connector in a delivery position according to the first embodiment of the invention.

A first embodiment of the connector position assurance (CPA) device 1 of the invention is described with reference to FIG. 1. The CPA device 1 is used in a connector 100 as illustrated in FIG. 2. The connector 100 and the CPA device 1 form a connector assembly 150 according to the invention. In use, the connector 100 can be assembled with a mating second connector and the CPA device 1 is used to secure the assembly.

The CPA device 1 comprises a main body 3 and a latching arm 5 extending from the main body 3 substantially in a mating direction x. At the distal extremity of the latching arm 5 is formed a latch head 7. The latching arm 5 presents a substantially quadratic cross-section and comprises a surface 9 of the distal extremity of the latching arm 5 extending at least partially in the mating direction x and a bottom surface 11*a* facing at least partially in a direction y perpendicular to the matching direction x, as well as a top surface 11*b* opposite the bottom surface 11*a*. The latching arm 5 furthermore comprises two side surfaces 13*a* facing in the opposite y direction and side surface 13*b* facing in the y direction perpendicular to the bottom surface 11. Instead of a quadratic cross section, other shapes like rectangular or circular can be used for the latching arm 5 according to variants.

In this embodiment, the latching arm 5 extends from the main body 3 at an acute angle α larger than 0°, in particular in a range of 1° to 60°, preferably between 2° to 30°, more preferably between 5° and 15° with respect to the mating direction x. The latch head 7 of the latching arm 5 presents a tip 15 with a tip surface 15*a* protruding from the top surface 11*b*. The latch arm 5 has a predetermined resilience against a force F1 applied on the latch head 7 of the arm 5 in the force direction y perpendicular to the mating direction x. The predetermined resilience is determined based on the acute angle α and the material properties, in particular the Young's modulus and the yield stress, of the material of the CPA device 1.

At the latch head 7 formed at the distal extremity of the latching arm 5, a lateral wing 17*a* extends from the first side surface 13*a* laterally in the direction opposed to the transversal direction z. Similarly, a second lateral wing 17*b* extends laterally from the second side surface 13*b* in the transversal direction z. The surface 9 of the distal extremity of the latching arm 5 comprises a chamfered surface portion 19 according to the invention. The chamfered surface portion 19 constitutes a chamfer at the edge connecting the surface 9 at the distal extremity of the latching arm 5 and the bottom surface 11*a*. Whereas the non-inclined portion of the surface 9 extends in the y-z plane, also called mating plane, the chamfered surface portion 19 forms an angle θ with the y-z plane. The acute angle θ is larger than 0°, preferably between 5° to 30° more in particular between 10° and 20°.

In this configuration, the chamfered surface portion 19 faces at least partially in the force direction y. In other words, the projection $n_y$ of the normal vector n of the chamfered surface portion 19 onto the force direction y has a positive value. The lateral wings 17*a*, 17*b* are disposed such that their respective distal surfaces 21*a*, 21*b* are part of the chamfered surface portion 19 in a single continuous plane. In this way, the chamfered surface portion 19 is formed partially by the lateral wings 17*a*, 17*b*.

The lateral wings 17*a*, 17*b* of the latching arm 5 of the CPA device 1 also comprise respectively contact surfaces 31*a*, 31*b* facing in the direction opposed to the force direction y perpendicular to the mating direction x. The lateral wings 17*a*, 17*b* further comprise respective chamfered surfaces 33*a*, 33*b* (33*b* not visible on FIG. 1) in regions substantially opposed to the surfaces 21*a*, 21*b* facing in the mating direction x, such that they face in a direction at least partially opposed to the mating direction x.

The main body 3 of the CPA device 1 defines an activation surface 23 opposite the latching arm 5 in the mating direction x. The activation surface 23 is used by a user to activate the CPA device 1, for example to move it from a delivery position to a final position as will be described herein.

Lateral protrusions 25*a* and 25*b* extend from the main body 3. In the embodiment represented in FIG. 1, two protrusions 25*a*, 25*b* extend laterally in the direction opposed to the transversal direction z from a flexible part 27 of the main body 3. The protrusions 25*a* and 25*b* are arranged on a flexible part 27 that is flexible in the direction z with respect to the main body 3. The flexibility is achieved by an elongated cavity 29 extending in the mating direction between the flexible part 27 and the main body 3.

As should be understood from the figures, corresponding protrusions, parts and cavities are provided on the opposite side of the main body 3 of the CPA device 1 in a symmetric manner with respect to the mating direction x.

The main body 3 furthermore comprises two guiding walls 35*a* and 35*b* on both sides of the latching arm 5. The guiding walls 35*a*, 35*b* provide the double function of guiding the CPA device within a space of the connector 100 on one hand, and of blocking the disassembly of the connector 100 from a connected second connector 200 when the CPA device 1 is in the final position, as set forth herein with reference to FIG. 4.

Finally, the main body 3 comprises two wedge portions 36*a*, 36*b* (wedge element 36*a* not visible). The wedge portions 36*a*, 36*b* protrude from the main body 3 in mating direction x on either side of the latch arm 5, however they are significantly shorter, in particular less than 20% of the length of the latch arm 5. The function of the wedge portions 36*a*, 36*b* will be described with reference to FIG. 4.

In this embodiment of the invention, the CPA device 1 is a monolith, for example formed by injection molding. This allows for a speedy and cost-efficient production, as well as for known and consistent material properties over the entirety of the device. As shown, the connector assembly 150 in the so-called delivery position, in which the connector 100 is not yet assembled with a second connector.

FIG. 2 illustrates the CPA device 1 mounted on the connector 100, thus forming the connector assembly 150. The connector 100 can be an electrical connector, e.g., comprising electrical contacts, electrical conductors and/or other connector electrical subcomponents (not represented) inside the connector housing 101. The electric contacts of a second connector can enter the connector housing 101 of the connector via connector housing opening 125.

The connector housing 101 includes a latch structure 107 arranged along the mating direction x. The latch structure 107 of the connector 100 extends partially into a space 105 comprised between two CPA support structures 103*a*, 103*b* and forms a latch structure cavity 109 with the connector housing 101. The latch structure is only supported at one end 107*a* in mating direction x, and can thus be elastically bent down in the direction y at other end 107*b*, located at the end of the latch structure 107 in the direction opposed to the mating direction x. The CPA device 1 is received in the space 105 such that the latch structure 107 accommodates the latching arm 5 of the CPA device 1 in a latch structure cavity 109. The guiding walls 35*a*, 35*b* of the CPA device 1 are configured to guide the CPA device along the support structure 103*a*, 103*b* and the latch structure 107 of the connector 100.

The latch structure 107 comprises a stop element 111. The stop element 111 bridges over the latch structure cavity 109 in a transversal direction z perpendicular to the mating direction x. The arrangement of the stop element 111 in a transversal direction z splits the latch structure 107 in two parts 113*a*, 113*b*. In the delivery position the latch arm 5 of CPA device 1 remains in part 113*a* and abuts against stopping surface 119 of the stop element 111 so that any further movement in along the mating direction x is prevented.

The CPA device 1 can be moved from the delivery position to the final position to assure a correct coupling between the connector and a second connector. This movement can take place when the abutment against the stopping surface 119 is removed by moving down the latch head 7 in force direction y below the bridge formed by the stop element 111, for example by applying force F1 on the latch head tip surface 7*a*. Then a user can push the CPA device 1 along the direction x beyond the stop element 111, so that the latch arm 5 is received in the second part 113*b*.

The CPA support structure 103*b* of the connector housing 101 comprises a through hole 115*a* and an elongated through hole 115*b*. Corresponding through holes are provided on the support structure 103*a*. In the embodiment represented in FIG. 2, the through holes 115*a*, 115*b* traverse the support structure 103*b* in a transversal direction z perpendicular to the mating direction x.

The through hole 115*a* is configured to accommodate the lateral protrusion 25*a* of the CPA device 1 when the CPA device 1 has moved from the delivery position into the final position. Thus, an inadvertent movement backwards, in a direction opposed to the mating direction x, from the final position to the delivery position can be prevented. Only by a wanted action by a user, namely by pressing the protrusion 25*a* out of the mating through hole 115*a* can the CPA device 1 be released again and can move back to the delivery position.

The lateral protrusion 25*b* is accommodated in the elongated through hole 115*b* which serves as a guiding tract for the CPA device 1 and limits the course of movement in x direction. The movement in the mating direction towards the final position is limited by the left end 115*b*_1, and the movement in the other direction towards the delivery position is limited by the right end 115*b*_2 of the elongated through hole 115*b*. Instead of an elongated through hole 115*b*, a recess, not extending through the wall of the CPA support structures 103*b*, can be provided according to a variant. FIG. 2 further illustrates a chamfer release surface 129*a* which will be explained in more detail herein.

Figure 3A:
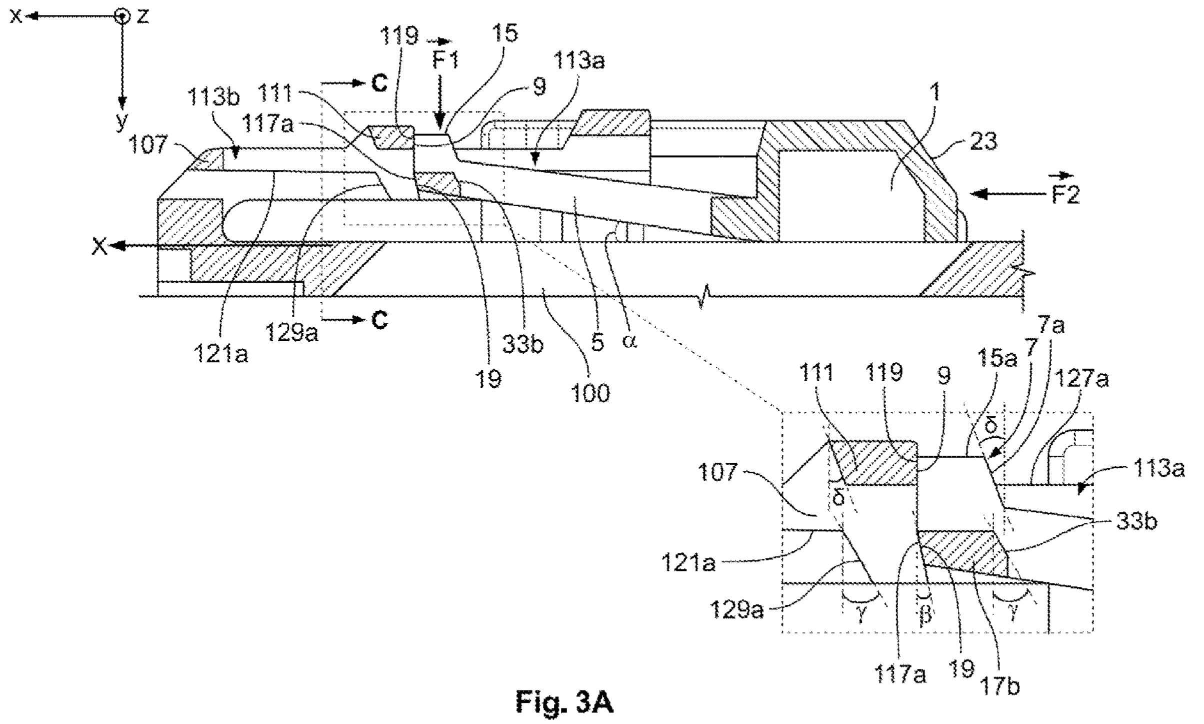
FIG. 3A illustrates a cross-sectional view of the connector assembly according to FIG. 2.
Figure 3B:
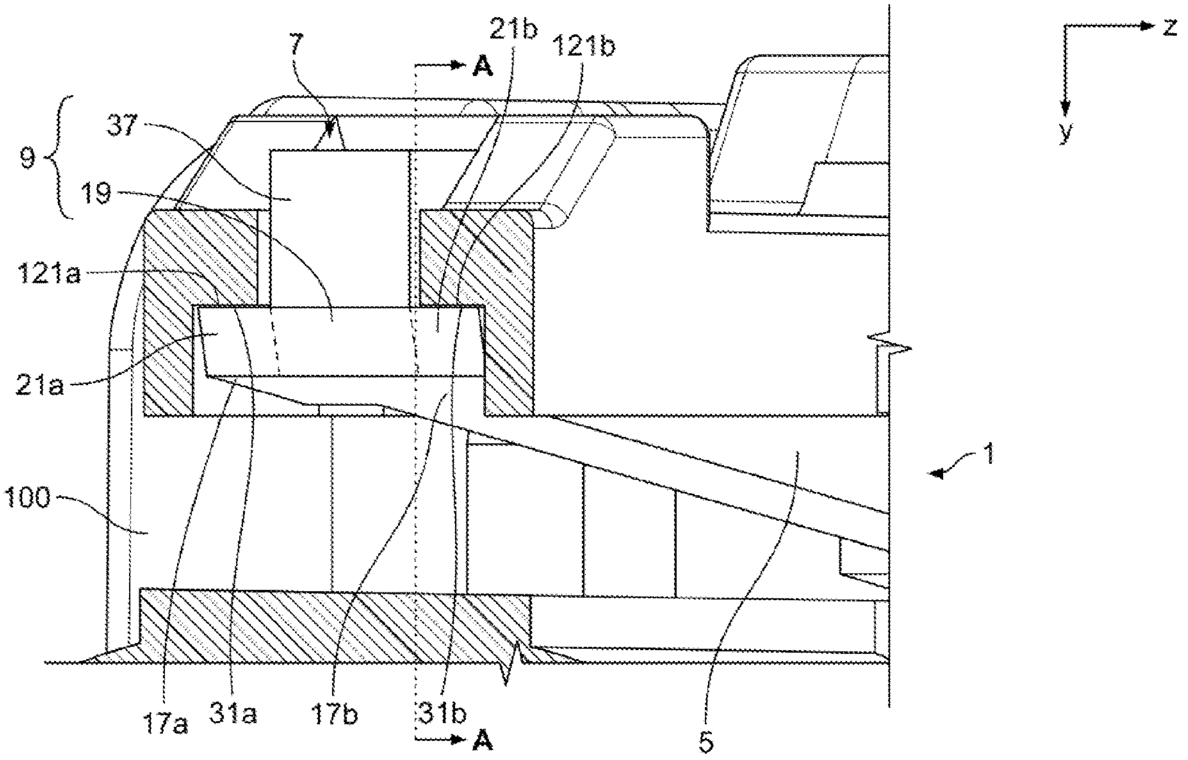
FIG. 3B illustrates another cross-section of the connector assembly of FIG. 2.

FIG. 3A shows a cut view of CPA device 1 and connector 100 assembled in delivery position as illustrated in FIG. 2. FIG. 3B shows a cut view of connector 100 assembled with the CPA device in final position. FIG. 3A corresponds to a cut view along the axis A in the x-y plane of FIG. 3B, while FIG. 3B corresponds to a cut view along the axis C in the y-z plane of FIG. 3A. The same reference numerals will be used as in the description of FIG. 1 and FIG. 2.

FIG. 3A provides a cross-sectional view along the x-y plane of the CPA device 1 and the upper part of the connector 100, when the CPA device 1 is in the delivery position with the connector 100. FIG. 3A also shows an enlarged view of the area where the CPA device 1 abuts against the stop element 111.

In FIG. 3A, the angle α between the latching arm 5 and the mating direction x is indicated. The mating direction x corresponds to the direction in which the CPA device 1 can be moved as will be explained below. As can be seen, the surface 9 of the distal extremity of the latching arm 5 of the CPA device 1 abuts in the y-z mating plane against the stopping surface 119 on the stop element 111 of the connector 100.

In addition, the chamfered surface portion 19 of surface 9 also abuts against a mating inclined surface portion 117*a* of the stopping surface 119. In particular, the part of chamfered surface portion 19 that is a distal surface 21*a* of the lateral wing 17*a* abuts against the mating inclined surface portion 117*b*. Similarly (but not visible on the figure), the part of chamfered surface portion 19 that is a distal surface 21*b* of the lateral wing 17*b* abuts against the mating inclined surface portion 117*b*. In this embodiment, only the distal surfaces 21*a*, 21*b* of the chamfered surface portion 19 abut against the stop element 111, and not the complete chamfered surface portion 19, due to a corresponding cross-sectional shape of the stop element 111.

The enlarged view illustrates that the latch head 7 is abutted against the stop element 111 such that the tip 15 protrudes beyond the surface 127*a* of cavity part 113*a* in the latch structure 107 of the connector 100. The tip surface 15*a* faces in a direction opposed to the force direction y.

The enlarged view in FIG. 3A furthermore illustrates the acute angle β of the chamfered surface portion 19 with respect to the y-z plane, and that the inclined surface portions 117*a*, 117*b* of the stop element 111 present substantially the same angle β. The enlarged view also displays that latch head 7 further comprises a latch head back surface 7*a*, which is inclined at an acute angle δ with respect to the y-z plane. FIG. 3A also shows movement range limiting surface 121*a*, which is a surface of the latch structure facing in the force direction y. Surface 121*a* limits the movement range of latch head 7 in an upwards direction, as will be further explained with reference to FIG. 3B and FIG. 4.

According to the invention, the chamfered surface portion 19 of the CPA device 1 together with the mating inclined surface portions 117*a*, 117*b* of the connector 100 reduce the risk of an accidental displacement of the latching arm 5 when an unintended light force F1 and/or an unwanted force F2, for example from mishandling or transport shocks, is applied to the activation surface 23 in the mating direction x.

The inclined engagement of the chamfered surface portion 19 of the CPA device 1 and the inclined surface portions 117*a*, 117*b* of the connector 100 will deviate a force F2 such that an unwanted displacement or bending of the latching arm 5 downward in direction y is prevented. Under the force F2, the latching arm 5 will tend to move upwards against the y direction. Thus, in the absence of a mating second connector or in case the second mating connector is not correctly put in place, the inclined engagement of the mating surfaces 19 and 117*a*, 117*b* can help in preventing false positive connections.

Further, in general terms, the overall interaction surface when the latching arm 5 abuts against the stop element 111 is increased, thus reducing the risk of false positive connections. At the same time, in the presence of a correctly positioned mating second connector providing a predetermined force F1 in accordance with the resilience of the latching arm 5, it will still be possible to push the latching arm 5 downward in the y direction, with forces in regular force ranges for such type of connectors.

FIG. 3B provides a three-dimensional view of a cross-section across axis C in FIG. 3A looking towards the CPA device 1, with the CPA device 1 in final position. This view illustrates that the cross-sectional surface of the latch head 7 of the CPA device 1 has substantially the shape of an inverted T.

The surface 9 of the distal extremity latching arm 5 comprises a substantially square non-inclined portion 37 and the chamfered surface portion 19. The distal surfaces 21*a*, 21*b* of the lateral wings 17*a*, 17*b* are part of the chamfered surface portion 19 in a single continuous plane. The surface 9 and the chamfered surface portion 19 together form the T-shaped area of engagement.

FIG. 3A illustrates the chamfered surface 33*b* of the lateral wing 17*b* (the chamfered surface 33*a* of wing 17*a* is not visible) facing at least partially in the direction opposed to the mating direction x. The connector 100 comprises the chamfer release surface 129*a*, which can be seen from another view in FIG. 2. A respective chamfer release surface 129*b* on the opposite side of the CPA device 1 with respect to the mating direction x is not visible in the figures.

The chamfered surface 33*b* facilitates the unlocking of the CPA device 1, when a user moves the CPA device 1 from the final position back to the delivery position, for example during disassembling of the connector 100 from a second connector 200, as will be described herein. In the final position, the latch head 7 protrudes from the latch cavity part 113*b* behind, in mating direction x, the stop element 111. The chamfered surface 33*b* softens the edge of the lateral wing 17*b* such that a bending of the latching arm 5 downward in force direction y is simplified, as it can slide on the chamfer release surface 129*b* of the connector 100. On the other side, the chamfered surface 33*a* can slide on the chamfer release surface 129*a*. In the same manner, the inclination of the latch head back surface 7*a* can facilitate the unlocking of the CPA device 1 by allowing the sliding of latch head back surface 7*a* to be simplified.

As can be seen in FIG. 3A, the acute angle γ between the chamfered surface 33*b* of the lateral wing 17*b* and the y-z plane, which is the same angle as between the chamfer release surfaces 129*b* and the y-z plane, is larger than the angle β. The angle γ is chosen to be larger to reduce the force necessary to bend the latching arm downwards in force direction y when a user wants to pull out the CPA device 1 in a direction opposed to the mating direction x to move it from the final position to the delivery position. The acute angel δ between the latch head back surface 7*a* and the y-z plane is also larger than angle β and can, in particular, be equal to the angle γ.

FIG. 3B illustrates a cross-section of the connector assembly 150 along the axis C of FIG. 3A, viewing in the direction opposed to the mating direction x, when the connector assembly 150 is in final position. As will be explained with reference to FIG. 4, the CPA device 1 is moved to the final position by bending the latch arm 5 downwards such that a push on the CPA device 1 can pass the latch head 7 underneath the stop element 111. When the latch head 7 has passed the stop element 111 the contact surfaces 31*a*, 31*b* of the lateral wings 17*a*, 17*b* of the latching arm 5 of the CPA device 1 respectively face in the direction opposed to the force direction y. In the final position illustrated in FIG. 3B, the contact surfaces 31*a*, 31*b* are used to limit the movement range of the latching arm 5 in the direction upwards, thus in the direction opposed to force direction y. Indeed, their movement is limited by corresponding movement range limiting surfaces 121*a*, 121*b* of the connector 100. The same movement range limiting function is fulfilled by the contact surfaces 31*a*, 31*b* of lateral wings 17*a*, 17*b* when the CPA device 1 is in delivery position, as shown in FIG. 3A.

Thus, in the delivery position, the movement of the latching arm 5 upward in the direction opposite the direction y is limited when the surfaces 31*a*, 31*b* abut against the surfaces 121*a*, 121*b*. This prevents the latching arm 5 bending upward under excessively high unwanted forces F2 in the mating direction x beyond the authorized range, as illustrated in FIG. 3B. Thus, a breakage due to an over-bending of the latching arm 5 is prevented.

Figure 4:
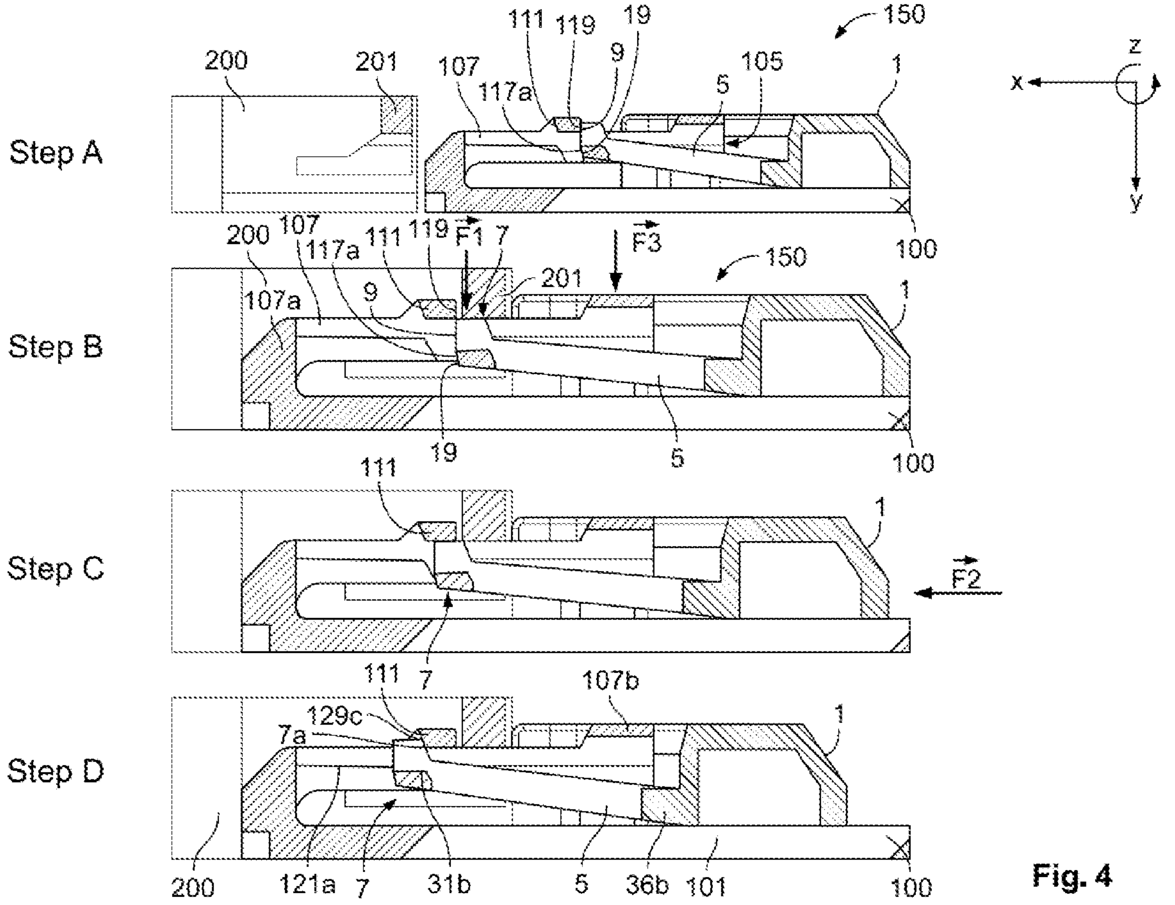
FIG. 4 illustrates a series of cross-sectional views of the CPA device and the connector of the connector assembly of FIG. 2, during successive stages of assembling the assembly with a second connector.

FIG. 4 provides four cross-sectional views of CPA device 1 and connector 100 along axis A of FIG. 3B, as in FIG. 3A. The four cross-sectional views show successive stages during the assembling of the connector assembly 150 of the invention with a mating second connector 200.

In a step A, the CPA device 1 is in the delivery position inside the space 105 of the connector 100 like illustrated in FIG. 3A. Thus, the surface 9 of the distal extremity of the latching arm 5 of the CPA device 1 is engaged with the stopping surface 119 of the stop element 111 of the connector 100, and the chamfered surface portion 19 is engaged with the mating inclined surface portions 117*a*, as well as 117*b*. The second connector 200 comprises a terminal end portion 201 configured to be slid along the latch structure 107 as the connector assembly 150 is moved in the mating direction x to be mated with the connector 200. In the situation as illustrated in step A, the second connector 200 is not yet connected.

In step B, the connector assembly 150 comprising CPA device 1 has been moved towards the second connector 200 along the mating direction x such that the terminal end portion 201 of the second connector 200 has slid upwards the latch structure 107 and passed the stop element 111. As described with reference to FIG. 2, the latch structure 107 is only supported by the connector 100 at the one end 107*a* and can thus be locally bent downwards by a force F3 in force direction y. Thus, the terminal end portion 201 passes the stop element 111 by temporarily bending the stop element 111 downwards, in force direction y, as the terminal end portion 201 is slid along the latch structure 107.

After I terminal end portion 201 of the second connector 200 has passed the stop element 111, it exerts a downward force F1 in force direction y onto the latch head 7 in the direction y substantially perpendicular to the mating direction x. This force is sufficient to overcome the resistance provided by the engagement of the chamfered surface portion 19 and mating inclined surface portions 117*a*, 117*b*. Consequently, the latching arm 5 is displaced in the force direction y as the stopping surfaces 9, 119 and the inclined surfaces 19, 117*a*, 117*b* are disengaged. The latching arm 5 displaced in direction y is then no longer blocked by the stop element 111.

In a step C as shown in FIG. 4, the CPA device 1 is then pushed in the mating direction x by applying a force F2 and the latch head 7 that is no longer blocked by the stop element 111 can move along the mating direction x underneath the stop element 111.

Step D illustrates the positioning of the CPA device 1 in the final position. The latch head 7 has passed beyond the stop element 111 in the mating direction x and, due to the restoration force of the predetermined resilience of the latch arm 5, has moved up again against direction y behind the stop element 111 until the latch head back surface 7*a* is engaged with the chamfer release surface 129*c*. In this position, the chamfered surfaces 33*a*, 33*b* are also engaged with the chamfer release surfaces 129*a*, 129*b* (not visible). As shown in FIG. 3B, contact surface 31*a* is engaged with range limiting surface 121*a*, and contact surface 31*b* with the range limiting surface 121*b*. Range limiting surfaces 121*a*, 121*b* block the movement of the latch head 7 upwards, in the direction opposed to the force direction y.

In this position, the CPA device 1 is inserted far enough into the space 105 that the guiding walls 35*a*, 35*b* engage laterally with the latch structure 107. In addition, the wedge portions 36*a*, 36*b* are engaged with the latch structure 107 such that they are positioned in between the other end 107*b* of the latch structure 107, and the connector housing 101. In this position, the wedge portions 36*a*, 36*b* block any elastic movement downward of the latch structure 107, for example the bending down of the latch structure 107 from manipulation, pushes or shocks on the other end 107*b*.

If the disassembling of the two connectors 100 and 200 is attempted, for example by pulling the two connectors 100 and 200 in opposite directions along mating direction x, the terminal end portion 201 of connector 200 is blocked by the stop element 111. The stop element 111 formed on the latch structure 107 cannot be moved downwards, as the other end 107*b* is blocked from bending downwards by the wedge portions 36*a*, 36*b*. Thus, the terminal portion 201 is locked inside the latch cavity part 113*a* behind the stop element 111, and cannot no longer be slid backwards (in mating direction x). Further, in this final position the protrusion 25*a* on the main body 3 is also locked in the corresponding through hole 115*a* of the connector as described above with respect to FIG. 2. Thus, the CPA device 1 assures the mating between the connector 100 and the second connector 200 and the CPA device 1 is firmly locked to the connector 100.

To disassemble the two connectors 100 and 200 from one another, first, the CPA device 1 has to be moved back from the final position to the delivery position. To do so, a force must be applied to the first protrusion 25*a*, such that the flexible part 27 on which it is formed moves in a transversal direction z, in order to move the protrusion 25*a* out of the through hole 115*a*. At the same time, the user has to pull the CPA device 1 in the direction opposite the mating direction x and apply a force such that the chamfered surfaces 33*a*, 33*b* of the lateral wings 17*a*, 17*b* as well as the latch head back surface 7*a* can slide over the engaged chamfer release surfaces 129*a*, 129*b*, 129*c* and displace the latch head 7 in a direction y such that top surface 11*b* of the latch arm 5 is disengaged from the stop element 111. Then, it can move under the stop element 111 back to the delivery position as shown in step B of FIG. 4. In this position, the second connector 200 can be removed again from the first connector 100.

Only once the CPA device 1 has been moved back into delivery position on the connector 100 can the end 107*b* of the latch structure 107 be actuated, i.e., bent downwards. By moving the latch structure 107, for example by pushing the other end 107*b*, downwards, the stop element 111 no longer blocks the way of the terminal portion 201 in mating direction x. Thus, the terminal end portion 201 of the second connector 200 can be slid backwards over the stop element 111, for example by pulling the second connector 200 in mating direction x for the disassembling of the connectors 100, 200.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A connector assembly, comprising:

a connector; and a connector position assurance (CPA) device adapted to assure mating in a mating direction between the connector and a second connector, the CPA device movably arranged in the connector between a delivery position and a final position, the CPA device comprising:

a main body; and a latching arm extending from the main body at least partially in the mating direction and having a predetermined resilience against a force applied on the arm in a force direction perpendicular to the mating direction, a surface of a distal extremity of the latching arm with respect to the main body includes at least one chamfered surface portion extending at an acute angle with respect to the surface of the distal extremity and facing at least partially in the force direction, the surface of the distal extremity is a surface on the latching arm that is furthest from the main body, the surface of distal extremity abuts against a stopping surface of a stop element of the connector and the chamfered surface portion abuts against an inclined surface portion of the stopping surface in the delivery position.

2. The connector assembly according to claim 1, wherein the distal extremity of the latching arm comprises at least one lateral wing extending laterally therefrom with respect to the mating direction.

3. The connector assembly according to claim 2, wherein the chamfered surface portion is at least partially formed by the at least one lateral wing.

4. The connector assembly according to claim 3, wherein the connector further comprises a limiting surface limiting a movement range of the latching arm via a form fit arrangement between the limiting surface and a surface of the at least one lateral wing.

5. The connector assembly according to claim 3, wherein the at least one lateral wing includes a chamfered surface facing in a direction at least partially opposed to the mating direction.

6. The connector assembly according to claim 5, wherein the chamfered surface is adjacent to a mating chamfer release surface of the connector in the final position.

7. The connector assembly according to claim 1, wherein the latching arm extends from the main body at a predetermined acute angle larger than 0° with respect to the mating direction.

8. The connector assembly according to claim 7, wherein the acute angle is between 2° and 30°.

9. The connector assembly according to claim 7, wherein the acute angle is between 5° and 15°.

10. The connector assembly according to claim 1, wherein an acute angle formed between the chamfered surface portion and the force direction is larger than 0°.

11. The connector assembly according to claim 10, wherein the acute angle formed between the chamfered surface portion and the force direction is between 10° and 20°.

12. The connector assembly according to claim 1, wherein the main body of the CPA device includes a first lateral protrusion with respect to the mating direction forming a form fit connection with a mating through hole in the connector locking the CPA device in the final position.

13. The connector assembly according to claim 12, wherein the main body of the CPA device includes a second lateral protrusion with respect to the mating direction extending into an elongated recess or through hole in the connector and guiding the CPA device between the delivery position and the final position.

14. The connector assembly according to claim 13, wherein at least one of the first lateral protrusion or the second lateral protrusion is formed on a flexible part of the main body such that it is laterally displaceable with respect to the mating direction.

15. The connector assembly according to claim 1, wherein a stop portion of the surface of the distal extremity that abuts against the stopping surface defines a plane that extends in the force direction and the chamfered surface portion extends at the acute angle from the plane of the stop portion of the surface of the distal extremity.

16. A connector assembly, comprising:

a connector; and a connector position assurance (CPA) device movably arranged with the connector between a first position and a second position, the second position assuring mating in a mating direction between the connector and a second connector, the CPA device including:

a body; and a latching arm extending from the body in the mating direction, a surface of a distal extremity of the latching arm has at least one chamfered surface portion extending at an acute angle with respect to the surface of the distal extremity and facing at least partially in a force direction perpendicular to the mating direction, the surface of the distal extremity is a surface on the latching arm that is furthest from the body, the surface of the distal extremity abuts against a stopping surface of a stop element of the connector and the chamfered surface portion abuts against an inclined surface portion of the stopping surface in the first position.

17. The connector assembly according to claim 16, wherein an acute angle formed between the chamfered surface portion and the surface of the distal extremity is between 10° and 20°.

18. The connector assembly according to claim 16, wherein the latching arm includes at least one lateral wing extending laterally therefrom with respect to the mating direction, the chamfered surface portion is at least partially defined by the at least one lateral wing.

19. The connector assembly according to claim 16, wherein the latching arm further defines a chamfered surface facing in a direction at least partially opposed to the mating direction and adjacent to a mating chamfer release surface of the connector in the second position.

20. The connector assembly according to claim 16, wherein the body of the CPA device includes:

a first lateral protrusion with respect to the mating direction defining a form fit connection with a mating through hole in the connector and locking the CPA device in the second position; and a second lateral protrusion with respect to the mating direction extending into an elongated recess or through hole in the connector and guiding the CPA device between the first position and the second position.

* * * * *